United States Patent
Kawamura et al.

(10) Patent No.: US 11,821,349 B2
(45) Date of Patent: Nov. 21, 2023

(54) EXHAUST GAS PURIFICATION CATALYST (71) Applicants: CATALER CORPORATION, Kakegawa (JP); TOYOTA JIDOSHA KABUSHIKI KAISHA, Toyota (JP)

(72) Inventors: Shogo Kawamura, Kakegawa (JP); Tomomasa Aikawa, Kakegawa (JP); Isao Naito, Kakegawa (JP); Hiroki Nihashi, Kakegawa (JP); Nobuyuki Takagi, Toyota (JP); Takeshi Nobukawa, Susono (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

(21) Appl. No.: 17/276,505

(22) PCT Filed: Sep. 9, 2019

(86) PCT No.: PCT/JP2019/035399
§ 371 (c)(1),
(2) Date: Mar. 16, 2021

(87) PCT Pub. No.: WO2020/071059
PCT Pub. Date: Apr. 9, 2020

(65) Prior Publication Data
US 2021/0277814 A1 Sep. 9, 2021

(30) Foreign Application Priority Data
Oct. 4, 2018 (JP) .............................. JP2018-189365

(51) Int. Cl.
*F01N 3/20* (2006.01)
*B01J 23/46* (2006.01)
*B01J 27/053* (2006.01)
*B01J 37/02* (2006.01)
*B01J 37/08* (2006.01)

(52) U.S. Cl.
CPC ................ *F01N 3/20* (2013.01); *B01J 23/46* (2013.01); *B01J 27/053* (2013.01); *B01J 37/02* (2013.01); *B01J 37/08* (2013.01); *F01N 2250/12* (2013.01); *F01N 2510/0684* (2013.01)

(58) Field of Classification Search
CPC .. F01N 3/20; B01J 23/46; B01J 27/053; B01J 27/02; B01J 27/08
See application file for complete search history.

(56) References Cited

U.S. PATENT DOCUMENTS

| | | | |
|---|---|---|---|
| 3,932,309 A | 1/1976 | Graham et al. | |
| 6,413,904 B1 | 7/2002 | Strehlau et al. | |
| 8,546,296 B2 * | 10/2013 | Yabuzaki | B01J 37/0248 428/116 |
| 8,741,799 B2 * | 6/2014 | Matsueda | B01J 37/0244 502/170 |
| 2011/0047975 A1 | 3/2011 | Nakayama et al. | |
| 2012/0065058 A1 | 3/2012 | Matsueda et al. | |
| 2012/0071318 A1 | 3/2012 | Matsueda et al. | |
| 2012/0088655 A1 | 4/2012 | Yabuzaki et al. | |
| 2012/0149557 A1 | 6/2012 | Hoshino et al. | |
| 2015/0251165 A1 | 9/2015 | Nagao et al. | |
| 2019/0083931 A1 | 3/2019 | Yanagawa et al. | |
| 2020/0030780 A1 | 1/2020 | Oishi et al. | |

FOREIGN PATENT DOCUMENTS

| | | |
|---|---|---|
| CN | 104888773 A | 9/2015 |
| JP | H05-237390 A | 9/1993 |
| JP | H11-285639 A | 10/1999 |
| JP | 2000-117110 A | 4/2000 |
| JP | 2001-232208 A | 8/2001 |
| JP | 2004-223403 A | 8/2004 |
| JP | 2010-022918 A | 2/2010 |
| JP | 2014-161771 A | 9/2014 |
| WO | 2010/137658 A1 | 12/2010 |
| WO | 2010/147163 A1 | 12/2010 |

(Continued)

OTHER PUBLICATIONS

May 25, 2021 Extended European Search Report issued in European Patent Application No. 19868631.3.

(Continued)

*Primary Examiner* — Yong L Chu
(74) *Attorney, Agent, or Firm* — Oliff PLC (57) ABSTRACT

An exhaust gas purification catalyst including an alkaline-earth metal carried on a porous carrier in a highly dispersed state. The catalyst layer of the exhaust gas purification catalyst has an alkaline-earth metal carrying region including a porous carrier, Pt, and a sulfuric acid salt of at least one alkaline-earth metal carried on the porous carrier, wherein a value of $R_{Ae/Pt}$ is 0.5 or more, where $R_{Ae/Pt}$ represents the Pearson's correlation coefficient calculated using α and β in each pixel obtained by, for a cross section of the region, performing the area analysis by FE-EPMA under the conditions of: pixel size 0.34 μm×0.34 μm; and number of measured pixels 256×256; and measuring an intensity (α: cps) of a characteristic X ray of an element (Ae) of the alkaline-earth metal and an intensity (β: cps) of a characteristic X ray of Pt for each pixel.

8 Claims, 5 Drawing Sheets

(56) References Cited

FOREIGN PATENT DOCUMENTS

| WO | WO-2010137658 A1 | * | 12/2010 | ........... B01D 53/944 |
|----|------------------|---|---------|-------------------------|
| WO | 2011/030831 A1   |   | 3/2011  |                         |
| WO | 2014/156746 A1   |   | 10/2014 |                         |
| WO | 2017/150350 A1   |   | 9/2017  |                         |
| WO | 2018/190300 A1   |   | 10/2018 |                         |

OTHER PUBLICATIONS

Mar. 23, 2021 International Preliminary Report on Patentability issued in International Patent Application No. PCT/JP2019/035399.
Aug. 12, 2021 Office Action issued in Japanese Patent Application No. 2018-189365.
Dec. 22, 2022 Office Action issued in Chinese Patent Application No. 201980065477.9.
Jan. 14, 2021 Office Action issued in Japanese Patent Application No. 2018-189365.

* cited by examiner

EXHAUST GAS PURIFICATION CATALYST

TECHNICAL FIELD

The present invention relates to an exhaust gas purification catalyst to be provided in the exhaust system of an internal combustion engine. More particularly, the present invention relates to an exhaust gas purification catalyst including platinum (Pt) as a catalyst metal, and further including an alkaline-earth metal such as barium (Ba) or strontium (Sr) as a co-catalyst component. The present application claims priority based on Japanese Patent Application No. 2018-189365 filed on 4 Oct. 2018, and the entire contents of the application are incorporated by reference in the present description.

BACKGROUND ART

As the exhaust gas purification catalyst for removing the hazardous component such as hydrocarbon (HC), carbon monoxide (CO), or nitrogen oxide (NOX) from the exhaust gas exhausted from the internal combustion engine such as automobile engine, by an oxidation or reduction reaction, a so-called three-way catalyst is used. As the three-way catalyst, for example, the one obtained by allowing a porous carrier including an inorganic oxide such as alumina ($Al_2O_3$) or zirconia ($ZrO_2$) to carry a metal functioning as an oxidation catalyst and/or a reduction catalyst (typically, a noble metal such as Pt) thereon is used.

Further, for this kind of exhaust gas purification catalyst, a co-catalyst component capable of improving the exhaust gas purifying function is used. For example, the following Patent Literature 1 and 2 describe a conventional exhaust gas purification catalyst including Pt as a catalyst metal, and an alkaline-earth metal such as barium (Ba) or strontium (Sr) as a co-catalyst.

CITATION LIST

Patent Literature

Patent Literature 1: Japanese Patent Application Publication No. H05-237390
Patent Literature 2: Japanese Patent Application Publication No. H11-285639

SUMMARY OF INVENTION

Technical Problem

Incidentally, in order to allow the foregoing alkaline-earth metal to exhibit the effects as a co-catalyst, the alkaline-earth metal is required to be present in the vicinity of Pt in the catalyst layer of the exhaust gas purification catalyst. Then, in order to allow the effects as a co-catalyst to be exhibited throughout the exhaust gas purification catalyst, it is important that the alkaline-earth metal is present with Pt in a highly dispersed state.

However, with a conventional catalyst layer formation method, in the catalyst layer (alkaline-earth metal carrying region), uneven distribution of the alkaline-earth metal occurs, making it impossible for the alkaline-earth metal to be carried on the outer surface and in the pore of the porous carrier in a highly dispersed state. In other words, in the vicinity of Pt carried in a highly dispersed state on the outer surface and in the pore of the porous carrier in the catalyst layer (alkaline-earth metal carrying region), the alkaline-earth metal cannot be carried (fixed) similarly in a highly dispersed state. For example, an inconvenience in that most alkaline-earth metal is unevenly distributed on the outer surface of the porous carrier may occur.

Under such circumstances, the present invention was created in order to solve such a conventional problem. It is an object of the present invention to provide an exhaust gas purification catalyst including an alkaline-earth metal of a co-catalyst component carried on a porous carrier in a highly dispersed state, and a manufacturing method capable of implementing such high dispersion carrying.

Solution to Problem

The present inventors conducted a detailed study on the presence state of the alkaline-earth metal such as Ba of a co-catalyst in the catalyst layer. Then, the following has been confirmed: when an alkaline-earth metal such as Ba is used as a water-insoluble sulfuric acid salt in the raw material stage, uneven distribution of the alkaline-earth metal occurs in the catalyst layer, and the highly dispersed state cannot be implemented. Further, in the case of using a raw material slurry including a water-soluble compound such as a nitric acid salt of Ba and supplying sulfuric acid or an ammonium sulfate solution to the slurry, to generate a sulfuric acid salt (insoluble matter) of an alkaline-earth metal such as Ba, the pH of the raw material slurry changes in the subsequent drying and firing stages, to excessively lean to the acidic side. As a result, the highly dispersed state cannot be kept, and uneven distribution of the alkaline-earth metal occurs. Likewise, the highly dispersed state cannot be implemented.

Under such circumstances, the present inventors conducted a study on the alkaline-earth metal such as Ba in the raw material stage thereof, and found that, by using the raw material in which a water-soluble compound of an alkaline-earth metal coexists with a given kind of S-containing water-soluble organic compound, it is possible to arrange (carry) a sulfuric acid salt of an alkaline-earth metal such as Ba in a highly dispersed state with Pt on a porous carrier in the catalyst layer (alkaline-earth metal carrying region). This has led to the completion of the present invention.

The present invention provides an exhaust gas purification catalyst that is configured to be arranged in the exhaust pipe of an internal combustion engine and configured to purify the exhaust gas exhausted from the internal combustion engine.

Namely, the exhaust gas purification catalyst herein disclosed includes a base material, and a catalyst layer formed on the base material. Such a catalyst layer has
an alkaline-earth metal carrying region including,
a porous carrier constituted of an inorganic compound,
Pt carried on the porous carrier, and
a sulfuric acid salt of at least one alkaline-earth metal carried on the porous carrier.

Then, the exhaust gas purification catalyst herein disclosed is characterized in that the value of $R_{Ae/Pt}$ is 0.5 or more,
where $R_{Ae/Pt}$ represents the Pearson's correlation coefficient, the Pearson's correlation coefficient being determined by performing an area analysis of a cross section of the alkaline-earth metal carrying region of the catalyst layer by FE-EPMA under the conditions of:
pixel (section) size 0.34 μm×0.34 μm; and
number of measured pixels (sections) 256×256; and measuring an intensity (α: cps) of a characteristic X ray of an element (Ae) of the alkaline-earth metal and an intensity (β: cps) of a characteristic X ray of Pt for each pixel, to measure the Pearson's correlation coefficient using α and β in each pixel.

The exhaust gas purification catalyst herein disclosed is a catalyst product which can be manufactured by the exhaust gas purification catalyst manufacturing method provided by the present invention (the details of which will be described later), and is characterized in that $R_{Ae/Pt}$ of the Pearson's correlation coefficient (product-moment correlation coefficient) calculated based on the results of the area analysis by FE-EPMA is 0.5 or more as described above.

Such a correlation coefficient $R_{Ae/Pt}$ is the correlation coefficient determined by $$R_{Ae/Pt}=(\text{covariance})/(\text{standard deviation of } \alpha \times \text{standard deviation of } \beta)$$

where the first variable is the characteristic X-ray intensity (α) of the alkaline-earth metal element (Ae) in the area analysis by FE-EPMA, and the second variable is the characteristic X-ray intensity (β) of multiple Pt in the same area analysis.

The exhaust gas purification catalyst with the present configuration is characterized in that in the alkaline-earth metal carrying region of the catalyst layer, there is a high correlation between Pt and the alkaline-earth metal element existence position (distribution), in other words, in that the alkaline-earth metal (sulfuric acid salt) is present in a highly dispersed state over the whole of the porous carrier particle (i.e., both of the outer surface and the inside (in the pore) of the carrier particle). As a result, in the alkaline-earth metal carrying region of the catalyst layer, an alkaline-earth metal can be present in the vicinity of the Pt particle with high frequency. For this reason, the advantageous effects of the alkaline-earth metal as a co-catalyst component can be exhibited at a high level. Particularly, the alkaline-earth metal is close to Pt. This causes the inhibition of HC poisoning of Pt due to the electron donation from the alkaline-earth metal, so that the HC purifying performance under a Rich atmosphere is improved.

Another preferable mode of the exhaust gas purification catalyst herein disclosed is characterized in that the calculated value of the Pearson's correlation coefficient $R_{Ae/Pt}$ is 0.7 or more.

As indicated by the value of $R_{Ae/Pt}$ of 0.7 or more, the exhaust gas purification catalyst with the present configuration is high in dispersibility of the alkaline-earth metal component. For this reason, the performances (functions) as the co-catalyst component can be exhibited at a high level in the catalyst layer (the alkaline-earth metal carrying region).

The average particle diameter based on the X-ray diffraction method of the alkaline-earth metal sulfuric acid salt carried on the porous carrier is in particular preferably 30 nm or less. The alkaline-earth metal component with such a fine average particle diameter can exhibit particularly high performances as a co-catalyst component.

Further, one preferable mode of the exhaust gas purification catalyst herein disclosed further has a catalyst layer including Rh as a catalyst metal on the downstream side in the direction in which the exhaust gas in the catalyst layer flows.

In this case, the amount of HC flowing to the catalyst layer including Rh as a catalyst metal is reduced. For this reason, the HC poisoning of Rh can be inhibited. Further, the alkaline-earth metal is a sulfuric acid salt, and is fixed. This can prevent the contact between Rh and an alkaline-earth metal such as Ba (particularly, Ba), and can prevent the metalation inhibition of Rh by Ba. For this reason, it is possible to improve the purifying action of the coexistent NOx under a Rich atmosphere of the exhaust gas purification catalyst.

Further, one preferable mode of the exhaust gas purification catalyst herein disclosed includes at least barium sulfate ($BaSO_4$) as the alkaline-earth metal sulfuric acid salt.

With the exhaust gas purification catalyst having such a configuration, the highly dispersed barium component (barium sulfate) can stably and temporarily occlude NOx, and the NOx component temporarily occluded in the component can be effectively subjected to reduction and purification treatments by Pt. Further, the barium component is highly dispersed, and is carried on a carrier. This can improve the NOx reducing action. Therefore, the exhaust gas purification catalyst with the present configuration can be preferably adopted as a high performance NOx purification catalyst.

Further, the present invention provides a method capable of preferably manufacturing the exhaust gas purification catalyst herein disclosed in order to implement the object. Namely, the manufacturing method herein disclosed is a method for manufacturing an exhaust gas purification catalyst that is configured to be arranged in an exhaust pipe of an internal combustion engine and configured to purify exhaust gas exhausted from the internal combustion engine, the method including the steps of:

forming, on a base material, a catalyst layer having at at least one part thereof an alkaline-earth metal carrying region that includes:
a porous carrier constituted of an inorganic compound,
Pt carried on the porous carrier, and
a sulfuric acid salt of at least one alkaline-earth metal carried on the porous carrier; and firing the base material that has the catalyst layer formed thereon.

Then, with the manufacturing method herein disclosed, the formation step of the catalyst layer includes:
(1) mixing the following components:
an inorganic compound particle forming the porous carrier;
a Pt particle or a precursor for precipitating Pt;
a water-soluble compound of the alkaline-earth metal; and
a S-containing water-soluble organic compound containing S as a constituent element, and capable of forming the sulfuric acid salt of the alkaline-earth metal;
with an aqueous solvent, to prepare a raw material suspension,
(2) drying and further firing the raw material suspension, thereby preparing a powder material including the porous carrier, Pt, and the sulfuric acid salt of the alkaline-earth metal mixed therein,
(3) preparing a slurry for forming an alkaline-earth metal carrying region, including at least the powder material and an aqueous solvent, and
(4) forming the alkaline-earth metal carrying region on the base material using the slurry.

With the exhaust gas purification catalyst manufacturing method with such a configuration, a raw material (suspension) obtained by mixing a water-soluble compound of an alkaline-earth metal and a S-containing water-soluble organic compound specified as described above with a carrier component (inorganic compound particle) and a catalyst metal component (a Pt particle or a compound of a precursor of Pt) is used for the purpose of forming an alkaline-earth metal carrying region.

In the prepared raw material suspension, the alkaline-earth metal water-soluble compound and the S-containing water-soluble organic compound are both dissolved in an aqueous solvent. At this step, the S-containing water-soluble organic compound will not rapidly reduce the pH of the raw material suspension (i.e., acidify the suspension). The alkaline-earth metal water-soluble compound and the S-containing water-soluble organic compound can both spread to the inside (in the pore) of the inorganic particle (secondary particle) of a carrier component while keeping the water solubility.

Then, the prepared raw material suspension is dried and fired. In the process, the water-soluble compound of the alkaline-earth metal and the S-containing water-soluble organic compound of the contained components react with each other, so that insoluble alkaline-earth metal sulfuric acid salt is formed in the inside and at the outside of the inorganic compound particle, and is fixed at the existing site thereof.

Therefore, with the manufacturing method having the present configuration, it is possible to preferably manufacture an exhaust gas purification catalyst having, at the whole or a part of the catalyst layer, the alkaline-earth metal carrying region characterized in that an alkaline-earth metal is present in a highly dispersed state over the whole of the porous carrier particle (i.e., both of the outer surface and the inside (in the pore) of the carrier particle).

One preferable mode of the exhaust gas purification catalyst manufacturing method herein disclosed is characterized in that, a water-soluble organic matter having at least one functional group of a sulfo group (—$SO_3H$), a sulfonyl group (—$S(=O)_2$—), and a sulfinyl group (—$S(=O)$—) is used as a S-containing water-soluble organic compound.

The organic compound having such a functional group including S is preferable as a S-containing water-soluble organic compound for preparing the raw material suspension.

Further, another preferable mode of the exhaust gas purification catalyst manufacturing method herein disclosed is characterized in that an acetic acid salt, a nitrous acid salt, or an iodide of any alkaline-earth metal selected from Ba, Sr, and Ca is used as the water-soluble compound of the alkaline-earth metal.

Such an acetic acid salt, a nitrous acid salt, or an iodide has good water solubility, and is preferable as the water-soluble compound of an alkaline-earth metal for preparing the raw material suspension.

DESCRIPTION OF EMBODIMENTS

Figure 1:
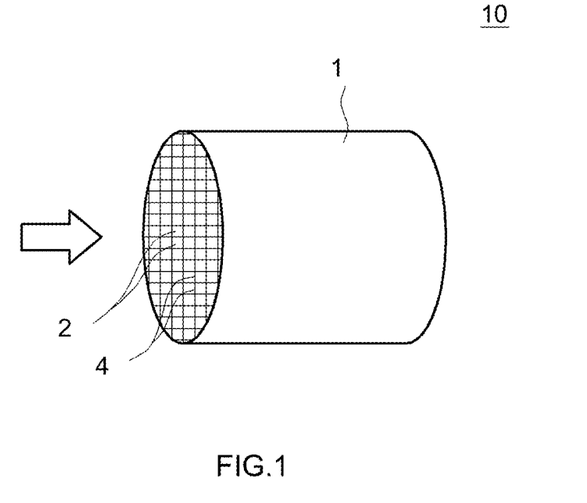
FIG. 1 is a perspective view schematically showing an exhaust gas purification catalyst in accordance with one embodiment.
Figure 2:
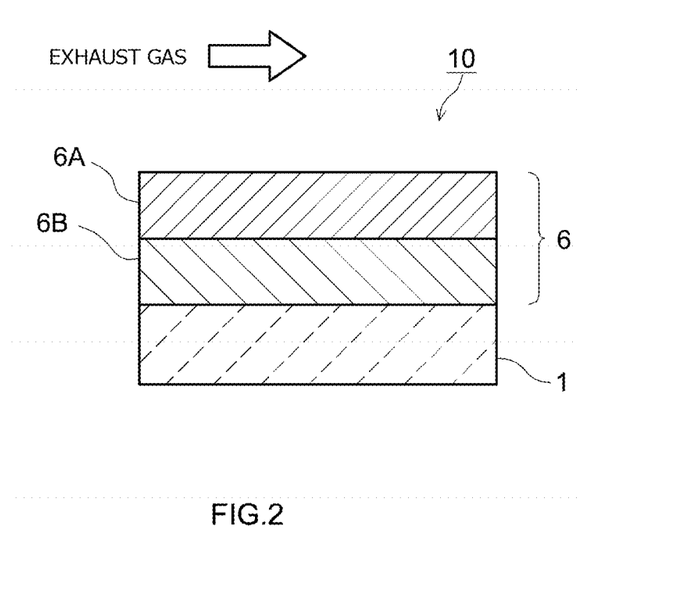
FIG. 2 is a cross sectional view schematically showing a catalyst layer of the exhaust gas purification catalyst in accordance with one embodiment.
Figure 3:
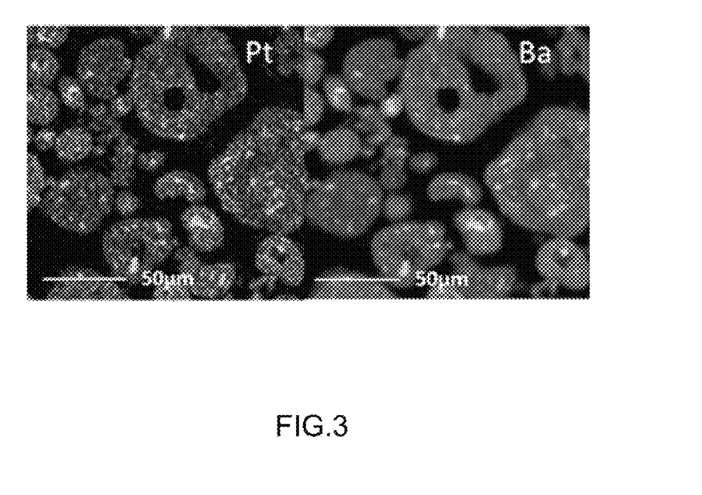
FIG. 3 is an image showing the element mapping results of Ba and Pt in area analysis (256×256 pixels) of FE-EPMA of a Pt-containing powder material used in Example 1.
Figure 4:
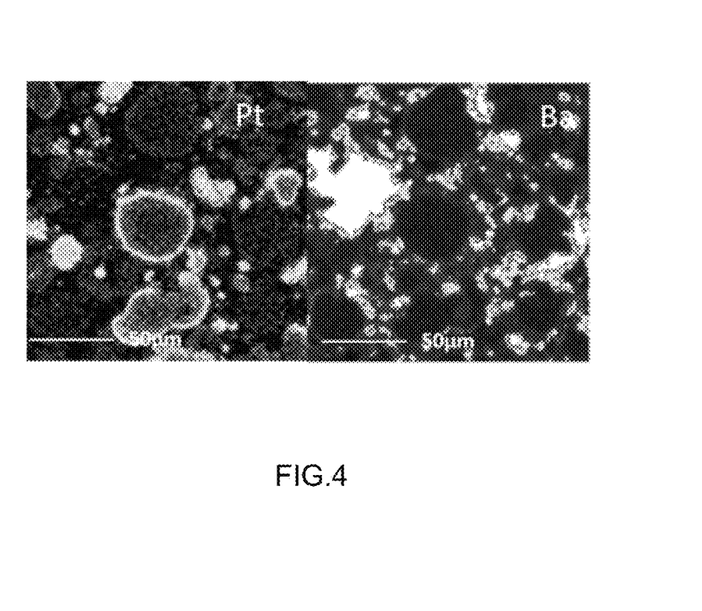
FIG. 4 is an image showing the element mapping results of Ba and Pt in area analysis (256×256 pixels) of FE-EPMA of a Pt-containing powder material used in Comparative Example 1.
Figure 5:
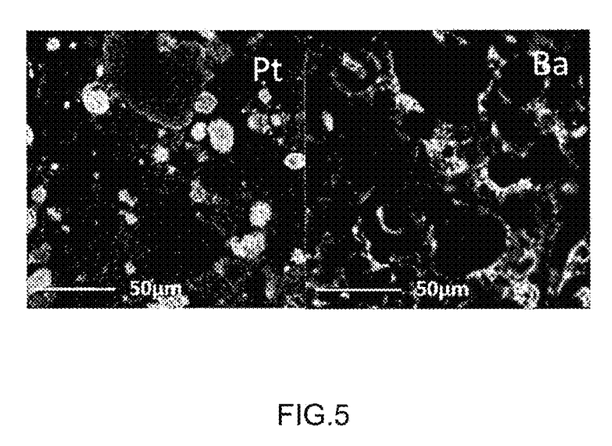
FIG. 5 is an image showing the element mapping results of Ba and Pt in area analysis (256×256 pixels) of FE-EPMA of a Pt-containing powder material used in Comparative Example 2.
Figure 6:
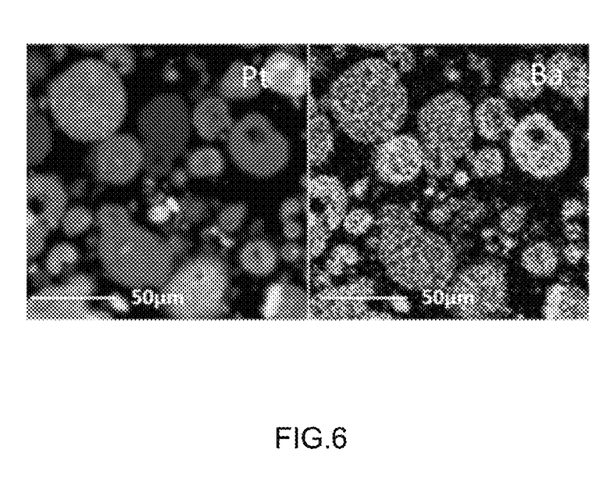
FIG. 6 is an image showing the element mapping results of Ba and Pt in area analysis (256×256 pixels) of FE-EPMA of a Pt-containing powder material used in Comparative Example 3.

Some preferable embodiments of the present invention will be described below with reference to the accompanying drawings. The matters necessary for executing the present invention, except for matters specifically herein referred to can be grasped as design matters of those skilled in the art based on the related art in the preset field. The present invention can be executed based on the contents disclosed herein and the technical knowledge in the present field. FIGS. 1 and 2 described later are intended to schematically show the contents of the present invention for better understanding, and the dimensional relation (such as length, width, or thickness) in each drawing does not reflect the actual dimensional relation.

The exhaust gas purification catalyst herein disclosed is an exhaust gas purification catalyst characterized by including a sulfuric acid salt of an alkaline-earth metal in a highly dispersed state in at least a part of the catalyst layer (i.e., the previously designed alkaline-earth metal carrying region in the catalyst layer) with the foregoing properties, and has no particular restriction on other configurations. The exhaust gas purification catalyst herein disclosed can be arranged at various internal combustion engines, particularly, the exhaust system (exhaust pipe) of an automobile engine by appropriately selecting the kind of a carrier and a base material described later, and being formed into a desired shape according to the use.

In the following description, a description will be mainly given assuming that the exhaust gas purification catalyst of the present invention is applied to the three-way catalyst provided at the exhaust pipe of the gasoline engine of an automobile, which is not intended to limit the exhaust gas purification catalyst herein disclosed to such a use.

<Base Material>

As the base materials forming the skeleton of the exhaust gas purification catalyst herein disclosed, various materials and forms conventionally for use in this kind of use can be adopted. For example, ceramic such as cordierite or silicon carbide (SiC) having a high heat resistance is preferable. Alternatively, a base material made of an alloy (such as stainless steel) can be used. The shape may also be the same as that of the conventional exhaust gas purification catalyst. As one example, mention may be made of a honeycomb base material 1 with a cylindrical outside shape, including through holes (cells) 2 as the exhaust gas passages provided in the cylindrical axial direction, and a partition (ribbed wall) 4 for partitioning respective cells 2 with which the exhaust gas can come in contact as the exhaust gas purification catalyst 10 shown in FIG. 1. The shape of the base material 1 can be a foam shape or a pellet shape other than the honeycomb shape. Alternatively, the base material 1 may be a base material of a so-called wall-through type (which is also referred to as a wall-flow type) in which the exhaust gas passes from one inlet-side cell through the cell partition to the other outlet-side cell. Further, for the outside shape of the whole base material, an elliptic cylindrical shape, or a polygonal cylindrical shape may be adopted in place of the cylindrical shape.

<Platinum (Pt)>

As the catalyst metal included in the catalyst layer of the exhaust gas purification catalyst herein disclosed, Pt is used.

Pt is preferably used as a fine particle with a sufficiently small particle diameter from the viewpoint of increasing the contact area with the exhaust gas. Typically, the average particle diameter (e.g., which is preferably the average value of the particle diameters determined by TEM observation, or the average value based on the X-ray diffraction method) is about 1 nm or more and 15 nm or less, 10 nm or less, 7 nm or less, and further in particular preferably 5 nm or less.

The carrying rate (Pt content with respect to 100 mass % of the carrier) of such a catalyst metal has no particular restriction, and is generally 2 mass % or less, for example, properly 0.05 mass % or more and 2 mass % or less, and preferably about 0.2 mass % or more and 1 mass % or less. When the carrying rate is excessively smaller than the range, the catalyst effects by Pt are less likely to be obtained. When such a carrying rate is excessively larger than the range, a disadvantage is caused in terms of cost.

<Carrier>

As the porous carrier forming the catalyst layer, and carrying Pt and other components (e.g., an alkaline-earth metal) thereon, the same inorganic compound as that of the conventional exhaust gas purification catalyst is used.

A porous carrier with a somewhat large specific surface area (the specific surface area measured by the BET method; the same shall apply hereinafter) is preferably used. Preferable examples thereof may include alumina ($Al_2O_3$), zirconia ($ZrO_2$), ceria ($CeO_2$), silica ($SiO_2$), titania ($TiO_2$), and a solid solution thereof (e.g., a ceria-zirconia composite oxide (CZ composite oxide), or a combination thereof.

From the viewpoint of enhancing the thermal stability of the exhaust gas purification catalyst, an inorganic compound such as alumina or zirconia with favorable heat resistance is preferably included in the catalyst layer as a carrier or a non-carrier (i.e., which denotes the constituent component of the catalyst layer not carrying Pt or an alkaline-earth metal; the same shall apply hereinafter).

The particle of the carrier or the non-carrier (e.g., alumina powder or CZ composite oxide powder) preferably has a specific surface area of 50 to 500 $m^2/g$ (e.g., 200 to 400 $m^2/g$) from the viewpoints of the heat resistance and the structure stability. Further, the average particle diameter based on the TEM observation of the carrier particle is preferably about 1 nm or more and 500 nm or less (more preferably 5 nm or more and 300 nm or less).

Further, when such an inorganic compound (ceramics) is used as the carrier, preferably, the catalyst metal content per 1 L of catalyst volume is properly about 0.1 to 5 g/L, and is preferably about 0.2 to 2 g/L. A too large catalyst metal content is not preferable in terms of cost, and a too small catalyst metal content is not preferable because the exhaust gas purifying ability is low. In the present description, the catalyst volume being 1 L denotes the bulk volume including the inside void (cell) (i.e., including the catalyst layer formed in the void (cell)) in addition to the pure volume of the base material being 1 L.

<Alkaline-Earth Metal Carrying Region>

The catalyst layer formed on the base material forms the main part of the exhaust gas purification catalyst as the field for purifying the exhaust gas. In the exhaust gas purification catalyst herein disclosed, as described above, at least a part (or the whole) of the catalyst layer forms the alkaline-earth metal carrying region.

In the present description, the "alkaline-earth metal carrying region" denote a part or the whole of the catalyst layer including a porous carrier, Pt, and an alkaline-earth metal sulfuric acid salt (such as barium sulfate or strontium sulfate). Herein, the wording "a part of the catalyst layer" is intended to mean one section capable of functioning as the exhaust gas purification catalyst, and is not intended to mean a microscopic part which cannot be considered as a functional one section, such as several to several tens of carrier particles.

The arrangement (distribution) of Pt to be carried on the catalyst layer can also be appropriately set according to various purposes as with the determination of the alkaline-earth metal carrying region. For example, in a catalyst layer 6 with a lamination structure shown in FIG. 2, the kind of the carrier as well as the kind and the content ratio of the catalyst metal to be carried on the carrier may be varied between the upper layer 6A and the lower layer 6B as with a conventional product.

Specifically, for example, in the case of the catalyst layer 6 of the lamination structure type having upper and lower two layers having mutually different contents formed on the base material 1 as with the catalyst layer 6 shown in FIG. 2 as one example, either one layer or both of the lower layer 6B closer to the base material 1 and the upper layer 6A forming the surface layer portion of the catalyst layer 6 can be formed as an alkaline-earth metal carrying region. Alternatively, in the catalyst layer of the lamination structure as shown or a monolayer structure, a part (e.g., 10 vol % or more of the total) of the upstream side (or, the downstream side) along the direction in which the exhaust gas flows may be formed as an alkaline-earth metal carrying region.

Herein, it is preferably configured such that a catalyst layer including Rh as a catalyst metal is further included on the downstream side in the direction in which the exhaust gas flows in the catalyst layer having the alkaline-earth metal carrying region. In this case, the amount of HC flowing to the catalyst layer including Rh as a catalyst metal is reduced. For this reason, the HC poisoning of Rh can be inhibited. Further, the alkaline-earth metal is a sulfuric acid salt, and is fixed. For this reason, Rh and an alkaline-earth metal such as Ba (particularly, Ba) can be prevented from coming in contact with each other, and the metalation inhibition of Rh by Ba can be prevented. Accordingly, it is possible to improve the purifying action of the coexistent NOx under a Rich atmosphere of the exhaust gas purification catalyst.

Examples of such a configuration may include a configuration in which the upper layer 6A is formed as an alkaline-earth metal carrying region, and Rh is included in the lower layer 6B side which is not the alkaline-earth metal carrying region, a configuration in which in the catalyst layer of a monolayer structure or a lamination structure, a part (e.g., 10 vol % or more of the total) of the upstream side in the direction in which the exhaust gas flows is formed as an alkaline-earth metal carrying region, and Rh is included in the residual downstream side region, and a configuration in which the upstream side is of a monolayer structure including an alkaline-earth metal carrying region, and the downstream side is of a lamination structure of the upper layer including Rh, and the lower layer including an alkaline-earth metal carrying region.

As the alkaline-earth metal element forming a preferable sulfuric acid salt to be included in the alkaline-earth metal carrying region, mention may be made of barium (Ba), strontium (Sr), or calcium (Ca). From the viewpoint of allowing the alkaline-earth metal to exhibit a high function as a co-catalyst component, Ba and Sr are preferable, and Ba is in particular preferable. Barium sulfate ($BaSO_4$) has a very high melting point, and is stable, and further has a very low solubility in water, and hence is preferable as an alkaline-earth metal to be carried on a carrier.

In the catalyst layer, other than Pt and the alkaline-earth metal, various auxiliary components can be arranged. As the typical example, mention may be made of an oxygen occluding releasing component (oxygen storage component: OSC). As the OSC materials, zirconium oxide (zirconia), cerium oxide (ceria), zeolite, and the like are preferably used. Further, from the viewpoint of the high heat resistance and occlusion/release rate, the ceria-zirconia composite oxide (CZ composite oxide) is preferably used as the OSC material.

The average particle diameter based on the X-ray diffraction method of the alkaline-earth metal sulfuric acid salt carried on the porous carrier is in particular preferably 30 nm or less. The alkaline-earth metal component with such a fine average particle diameter can exhibit a particularly high performance as the co-catalyst component.

<Pearson's Correlation Coefficient>

Regarding the dispersibility of the alkaline-earth metal in the alkaline-earth metal carrying region of the exhaust gas purification catalyst herein disclosed, when the area analysis of the cross section of the alkaline-earth metal carrying region of the catalyst layer 6 by FE-EPMA is performed under the conditions of:

pixel size 0.34 μm×0.34 μm; and
number of measured pixels 256×256; and
the intensity (α: cps) of the characteristic X ray of the element (Ae) of the alkaline-earth metal and the intensity (β: cps) of the characteristic X ray of Pt are measured for each pixel, the value of $R_{Ae/Pt}$ is 0.5 or more where $R_{Ae/Pt}$ represents the Pearson's correlation coefficient of calculated using obtained α and β in each pixel.

When an alkaline-earth metal is carried in the carrier inside (particularly, the carrier secondary particle inside) in a highly dispersed state, the more the correlation is observed between the existence position of Pt and the existence position of the alkaline-earth metal, the closer, Pt and the alkaline-earth metal come to each other.

The state in which the alkaline-earth metal is highly dispersed in the carrier inside (particularly the carrier secondary particle inside), and Pt and the alkaline-earth metal are close to each other can be obtained by the value of $R_{Ae/Pt}$ of 0.5 or more.

When the value of $R_{Ae/Pt}$ is 0.5 or more, the advantageous effects of the alkaline-earth metal as a co-catalyst component can be exhibited at a high level. Particularly, the alkaline-earth metal is close to Pt. This causes inhibition of HC poisoning of Pt by the electron donation from the alkaline-earth metal, resulting in the improvement of the HC purifying performance under a Rich atmosphere.

The higher the value of $R_{Ae/Pt}$, the higher the dispersibility of the alkaline-earth metal component in the exhaust gas purification catalyst with the present configuration. Therefore, the performances (functions) as the co-catalyst component can be exhibited in the catalyst layer (alkaline-earth metal carrying region) at a high level. Accordingly, the value of $R_{Ae/Pt}$ is preferably 0.6 or more and more preferably 0.7 or more.

The Pearson's correlation coefficient: $R_{Ae/Pt}$ can be calculated using α and β in each pixel obtained in the following manner: the area analysis by FE-EPMA is performed, and the intensity (α: cps) of the characteristic X ray of the element (Ae) of an alkaline-earth metal and the intensity (β: cps) of the characteristic X ray of Pt are measured for each pixel. The FE (Field Emission)-EPMA (Electron Probe Micro Analysis) is an analysis method also referred to as a field emission type electron beam microanalyzer, and can perform element analysis and mapping in a prescribed region of the sample with high precision. $R_{Ae/Pt}$ can be determined by calculation using the data obtained in the following manner: by adopting such FE-EPMA, the α and β in the catalyst layer (alkaline-earth metal carrying region) of the exhaust gas purification catalyst are measured with a prescribed number of pixels.

Namely, $R_{Ae/Pt}$ of the Pearson's correlation coefficient (product-moment correlation coefficient) is, $R_{Ae/Pt}$=(covariance)/(standard deviation of α×standard deviation of β), and can be specifically determined by the following equation (1).

[Math. 1]

$$R_{Ae/Pt} = \frac{\sum(\alpha - \bar{\alpha})(\beta - \bar{\beta})}{\sqrt{\sum(\alpha - \bar{\alpha})^2 \sum(\beta - \bar{\beta})^2}} \quad (1)$$

The calculation of the correlation coefficient $R_{Ae/Pt}$ based on such an equation (1) can be derived by using commercially available general spreadsheet software without performing a particularly difficult calculation processing by manual calculation. For example, using the CORREL function feature of the Excel (trademark) which is a product of Microsoft Corporation, the calculation of the correlation coefficient $R_{Ae/Pt}$ can be derived with ease.

Further, data collection for correlation coefficient calculation can be performed by operating the area analysis by FE-EPMA according to the manual of the commercially available device.

In summary, the catalyst layer (alkaline-earth metal carrying region) of the exhaust gas purification catalyst for area analysis is first cut out to be used, or the surface of the powder material is polished, thereby to expose the cross section, and a conductive substance (typically, carbon) is deposited thereon, resulting in a sample for EPMA analysis. Then, using a commercially available device (e.g., an electron beam microanalyzer such as model: JXA-8530F manufactured by JEOL Ltd.), area analysis is performed.

Herein, the pixel (section) size can be set at 0.34 μm×0.34 μm, and the number of pixels (sections) to be measured can be set at 200×200 or more, for example, 256×256. The measurement conditions depend upon the analysis device, and hence have no particular restriction. As typical some measurement conditions, mention may be made of:

acceleration voltage: 10 kV to 30 kV (e.g., 20 kV),
irradiation current: 50 nA to 500 nA (e.g., 100 nA),
minimum probe diameter: 500 nm or less (e.g., 100 nm), and
unit measurement time: 40 ms to 100 ms (e.g., 50 ms).

Further, using application (computer software) attached to a commercially available device, the results of the area analysis by FE-EPMA can be displayed as element mapping (see the drawing described later).

The method for manufacturing an exhaust gas purification catalyst in accordance with the present embodiment includes a step of forming, on a base material, a catalyst layer having at at least a part thereof an alkaline-earth metal carrying region including a porous carrier constituted of an inorganic compound, Pt carried on the porous carrier, and a sulfuric acid salt of at least one alkaline-earth metal carried on the porous carrier, and a step of firing the base material including the catalyst layer formed thereon.

Herein, in the formation step of the catalyst layer, an inorganic compound particle constituting the porous carrier; a Pt particle or a precursor for precipitating Pt; a water-soluble compound of the alkaline-earth metal; and a S-containing water-soluble organic compound including S as a constituent element and capable of forming a sulfuric acid salt of the alkaline-earth metal are first mixed with an aqueous solvent, thereby preparing a raw material suspension.

Then, the raw material suspension is dried, and is further fired, thereby preparing a powder material including the porous carrier, Pt, and a sulfuric acid salt of an alkaline-earth metal mixed therein.

Subsequently, an alkaline-earth metal carrying region forming slurry including at least the powder material and an aqueous solvent is prepared.

Then, using the slurry, the alkaline-earth metal carrying region is formed on the base material.

As for the materials to be used, examples of the inorganic compound forming the porous carrier are the same as those described above.

Examples of the precursor for precipitating Pt may include a water-soluble complex and a salt of Pt.

As the water-soluble compounds of the alkaline-earth metal, mention may be made of various salts such as hydroxides, halides, acetic acid salts, nitric acid salts, nitrous acid salts, and the like of Ba, Sr, or Ca. The ones with high solubility in water (e.g., acetic acid salts, nitrous acid salts, and iodides, and particularly, barium acetate, barium nitrite, and barium iodide) are in particular preferable.

The S-containing water-soluble organic compound has no particular restriction so long as it can form a sulfuric acid salt of an alkaline-earth metal in the process of preparing, drying, and firing the raw material suspension. Preferable examples thereof may include taurine (2-aminoethane sulfonic acid), aminobenzenesulfonic acid, aminomethane sulfonic acid, 1-amino-2-naphthol-4-sulfonic acid, cysteic acid, methionine, cystine, dimethyl sulfate, dimethyl sulfide, dimethyl trisulfide, 2-mercapto ethanol, diphenyl sulfide, dithiothreitol, allyl disulfide, sulfolane, furfuryl mercaptan, dipropyl disulfide, dimethyl sulfone, and dimethyl sulfoxide.

Out of these, use of the water-soluble organic matter having at least any one functional group of a sulfo group ($-SO_3H$), a sulfonyl group ($-S(=O)_2-$), a sulfinyl group ($-S(=O)-$) in the molecule is good in reactivity for forming a sulfuric acid salt, and is preferable.

Further, the one having a basic group such as an amino group ($-NH_2$) has a high effect of preventing the reduction of pH (i.e., strong acidification) of the raw material suspension, and hence is preferable.

Further, because of not being designated as a toxic substance or a poisonous substance, being ease to handle, having particularly high solubility in water, and having a sulfonic acid group, and an amino group in the molecule, and hence being particularly small in pH variation during sulfuric acid salt preparation, taurine (2-aminoethane sulfonic acid), aminobenzenesulfonic acid, aminomethane sulfonic acid, 1-amino-2-naphthol-4-sulfonic acid, cysteic acid, methionine, and cystine are particularly preferable.

As the specific operation, the above-described various materials (an inorganic compound particle, a Pt particle or a precursor for precipitating Pt, a water-soluble compound of an alkaline-earth metal, and a S-containing water-soluble organic compound) is added to an aqueous solvent (typically, water, for example, pure water or deionized water), and the mixture is well stirred using a stirrer. As a result, a raw material suspension in a slurry form can be prepared. For example, a Pt particle or a precursor for precipitating Pt is first suspended in water. To the resulting suspension, an inorganic compound particle (powder) forming a porous carrier is mixed with stirring. Further, a water-soluble compound of an alkaline-earth metal is added, and the mixture is well stirred for a prescribed time (e.g., 10 minutes to 60 minutes). Then, a S-containing water-soluble organic compound is added. The resulting mixture is dried within a temperature range of about 90° C. to 130° C. sufficiently (e.g., for 6 hours or more, and preferably 8 hours or more), and is further fired within a temperature range of about 400° C. to 600° C. over several hours (e.g., about 1 to 3 hours). By such a process, at the previous stage of forming the catalyst layer (including the alkaline-earth metal carrying region), it is possible to prepare a powder material including Pt and an alkaline-earth metal sulfuric acid salt carried (fixed) on the outer surface and in the inside (in the pore) of an porous carrier particle (secondary particle) in a higher dispersed state. The resulting powder material can be subjected to a grinding treatment, if required, thereby to be adjusted to a desirable particle size (e.g., a particle diameter of 10 μm or less).

By such a process, the particle diameter of the alkaline-earth metal sulfuric acid salt to be carried on the outer surface and in the pore of the porous carrier particle can be made much smaller than conventional one.

Typically, in accordance with the technology herein disclosed, such a fine alkaline-earth metal sulfuric acid salt (e.g., barium sulfate) particle as to have an average particle diameter based on the X-ray diffraction method of 30 nm or less (e.g., 10 nm or more and 30 nm or less), and preferably 20 nm or less can be carried in a highly dispersed state on the outer surface and in the pore of the porous carrier particle.

Then, the process can implement such a highly dispersed state that the correlation coefficient: $R_{Ae/Pt}$ is 0.5 or more, further 0.6 or more, and still further 0.7 or more.

Then, using the resulting powder material (which has been appropriately subjected to a grinding treatment), a catalyst layer (alkaline-earth metal carrying region) forming slurry is prepared. The preparation of such a slurry may be the same as with the case of forming the catalyst layer of a conventional exhaust gas purification catalyst, and has no particular restriction.

For example, when an upper layer 6A of an alkaline-earth metal carrying region is formed on the base material 1 of the exhaust gas purification catalyst 10 of the upper and lower two-layer structure type mutually different in configuration of the catalyst layer 6 as shown in FIG. 2, a lower layer forming slurry including a desirable catalyst metal component (a solution including a catalyst metal ion (e.g., Rh) other than Pt) and a desirable carrier powder (such as alumina, zirconia, or an OSC material including a CZ composite oxide) is coated on the honeycomb base material 1 by a washcoat method, or the like.

Then, an alkaline-earth metal carrying region forming slurry including the prepared powder material, and further, if required, a carrier powder not including an alkaline-earth metal carried thereon (e.g., alumina, zirconia or an OSC material such as a CZ composite oxide) is coated in a laminated manner on the surface of the lower layer 6B by a known washcoat method, or the like.

Alternatively, in place of such one firing process, the following process of performing two-stage firing is also acceptable: the lower layer forming slurry is coated on the honeycomb base material 1, and then, is dried and fired at a prescribed temperature for a prescribed time; as a result, first, the lower layer is formed; then, the alkaline-earth metal carrying region forming slurry is coated on the surface of the lower layer, and is dried and fired, thereby forming the upper layer of the catalyst layer.

The firing conditions of the washcoated slurry vary according to the shape and the size of the base material or the carrier, and hence have no particular restriction. Typically, by performing firing at about 400° C. to 1000° C. for about 1 to 5 hours, it is possible to form a catalyst layer with the objective alkaline-earth metal carrying region and other regions. Further, the drying conditions before firing have no particular restriction. Drying at a temperature of 80° C. to 300° C. for about 1 to 12 hours is preferable.

Further, when the catalyst layer 6 is formed by a washcoat method, in order to suitably bring the slurry into close contact with the surface of the base material 1, and further with the surface of the lower layer 6B in the case of the lamination-structured catalyst layer, the slurry is preferably allowed to include a binder. As such objective binder, for example, alumina sol or silica sol is preferably used. The viscosity of the slurry may be appropriately adjusted so that the slurry can readily flow into the cell 2 of the base material (e.g., the honeycomb base material) 1.

Some Examples regarding the present invention will be described below. However, it is not intended that the present invention is limited to such specific examples.

Test Example 1: Preparation of Exhaust Gas Purification Catalyst

In the present Test Example, using a cylindrical honeycomb base material (i.e., a honeycomb base material with a catalyst volume of 0.875 L and made of cordierite) with a diameter: 103 mm, and an overall length: 105 mm as shown in FIG. 1, an exhaust gas purification catalyst having the two-layer structure catalyst layer as shown in FIG. 2 was prepared in the following manner.

Example 1

Dinitrodiammine platinum in a Pt amount of 17.5 g was added to 1 L of pure water and this was stirred, thereby manufacturing a suspension. To the suspension, 740 g of alumina was added. Then, 72 g of barium acetate was added with stirring. Then, 70 g of taurine was added and this was stirred, thereby manufacturing a raw material suspension in a slurry form.

The raw material suspension was dried at 110° C. for 8 hours or more, followed by firing at 500° C. for 2 hours. Then, a proper grinding treatment was performed until the particle diameter became 10 μm or less, thereby manufacturing a Pt-containing powder material.

Then, the manufactured Pt-containing powder material, 1800 g of a CZ composite oxide powder with a content of Ce of 30 wt %, and 87 g of an alumina binder were added to 3.6 L of pure water, and the mixture was subjected to wet grinding using a magnetic ball mill, thereby preparing an upper layer forming slurry.

On the other hand, rhodium nitrate in an amount of 5.6 g in terms of Rh amount was suspended in 0.9 L of pure water. To the resulting suspension, 803 g of a zirconia powder was added, and dried, followed by firing at 500° C. for 2 hours. Then, a proper grinding treatment was performed until the particle diameter became 10 μm or less, thereby manufacturing a Rh-containing powder material. For the Rh-containing powder material, 415 g of an alumina powder, 413 g of a CZ composite powder with a Ce content of 20 wt %, and 61 g of an alumina binder were added to 2.3 L of pure water. The resulting mixture was subjected to wet grinding using a magnetic ball mill, thereby preparing a lower layer forming slurry.

First, using the lower layer forming slurry, the base material was subjected to washcoating, and was dried at 150° C. for 1 hour, thereby forming a lower layer (non-fired coating layer) on the surface of the base material (the ribbed wall surface in the cell). Then, using the upper layer forming slurry, the base material was subjected to washcoating, and was dried at 150° C. for 1 hour, thereby forming an upper layer (non-fired coating layer) in a laminated manner on the surface of the lower layer. Subsequently, firing at 500° C. for 1 hour was performed, resulting in an exhaust gas purification catalyst having a catalyst layer including the upper and lower two layers formed therein (the coating amount was set at 220 g/L in total of the upper and lower layers).

Example 2

An exhaust gas purification catalyst was obtained in the same manner as in Example 1, except that a raw material suspension was dried at 30° C. for 48 hours in place of being dried at 110° C. for 8 hours or more for manufacturing a Pt-containing powder material.

Comparative Example 1

An exhaust gas purification catalyst was obtained in the same manner as in Example 1, except that 66 g of barium sulfate was used in place of 72 g of barium acetate as the Ba source, and taurine of a Ba fixing material was not added for manufacturing a Pt-containing powder material.

Comparative Example 2

An exhaust gas purification catalyst was obtained in the same manner as in Example 1, except that 74 g of ammonium sulfate of an inorganic compound was used in place of 70 g of taurine of a Ba fixing material for manufacturing a Pt-containing powder material.

Comparative Example 3

An exhaust gas purification catalyst was obtained in the same manner as in Example 1, except that taurine of a Ba fixing material was not added for manufacturing a Pt-containing powder material.

Test Example 2: Confirmation of Dispersibility of Barium Sulfate by FE-EPMA of Pt-Containing Powder Material Using a FE-EPMA device (JXA-8530F) manufactured by JEOL Ltd. according to the manual, each Pt-containing powder material manufactured in Test Example 1 was subjected to area analysis.

Namely, the surface of each powder material in a prescribed amount was polished to expose the cross section. Using a commercially available carbon coater (product from Vacuum Device Co., Ltd.: VC-100W), carbon as a conductive substance was deposited thereon. Then, the region corresponding to the Pt-containing powder material of the carbon deposited surface was appropriately defined, and such a region was subjected to area analysis by FE-EPMA. The measurement conditions were set as:

Pixel size: 0.34 μm×0.34 μm,
Number of pixels measured: 256×256,
Acceleration voltage: 20 kV,
Irradiation current: 100 nA,
Probe diameter: set at the minimum in the measurement conditions,
Unit measurement time: 50 ms/1 pixel, and
Measurement magnification: ×1000.

Then, for every pixel, the intensity ($\alpha$: cps) of the characteristic X ray of Ba element and the intensity ($\beta$: cps) of the characteristic X ray of Pt were measured.

In such area analysis, the threshold value of the X ray intensity per 1 pixel (section) was set at 15 cps for Ba, and at 5 cps for Pt, and the pixel showing an intensity equal to, or smaller than the threshold value was excluded from the data for calculation of the correlation coefficient.

Thus, the area analysis was performed. From the resulting data, using the CORREL function feature of the spreadsheet software "Excel", the correlation coefficient $R_{Ba/Pt}$ was determined. The results are shown in Table 1.

Further, for the sample of Example 1 and the samples of Comparative Examples 1 and 2, the data sets (images) regarding the element mapping of Ba and S are shown in FIGS. 3 to 6.

Test Example 3: Ba Dissolution Behavior Test

The amount of Ba dissolved when each Pt-containing powder material manufactured in Test Example 1 was suspended in pure water, and an acid was added thereto was measured by an ICP emission spectrophotometer manufactured by Agilent Technologies, Inc., (Agilent 5110 ICP-OES), thereby determining the Ba dissolution rate. The results are shown in Table 1.

$R_{Ba/Pt}$ is 0.798, it is observed that the existence position of Pt and the existence position of Ba have particularly strong correlation.

On the other hand, in Comparative Example 1 and Comparative Example 2, the values of the correlation coefficient $R_{Ba/Pt}$ were −0.128 and 0.060, respectively, and the correlation was not observed between the existence positions of Pt and Ba.

This indicates that not only Ba is more highly dispersed, but also Pt and Ba are closer to each other in Example 1 as compared with Comparative Examples 1 and 2. In Comparative Example 3, the value of the correlation coefficient $R_{Ba/Pt}$ was 0.720, indicating that a strong correlation was observed between the existence positions of Pt and Ba. However, the Ba dissolution rate was 70%, and Ba could not be fixed.

Test Example 4: HC Purification Ratio Measurement of Pt-Containing Powder Material A pellet of each Pt-containing powder material used in Example 1 and Comparative Example 1 was manufactured. Using a tube furnace, Rich/Lean durability was tested. Then, using an activity evaluation device (CATA5000) manufactured by Best Instruments Co., Ltd., the HC purification ratio after 3 minutes from switching of the air-to-fuel ratio from Lean to Rich was measured. The results are shown in FIG. 7.

Figure 7:
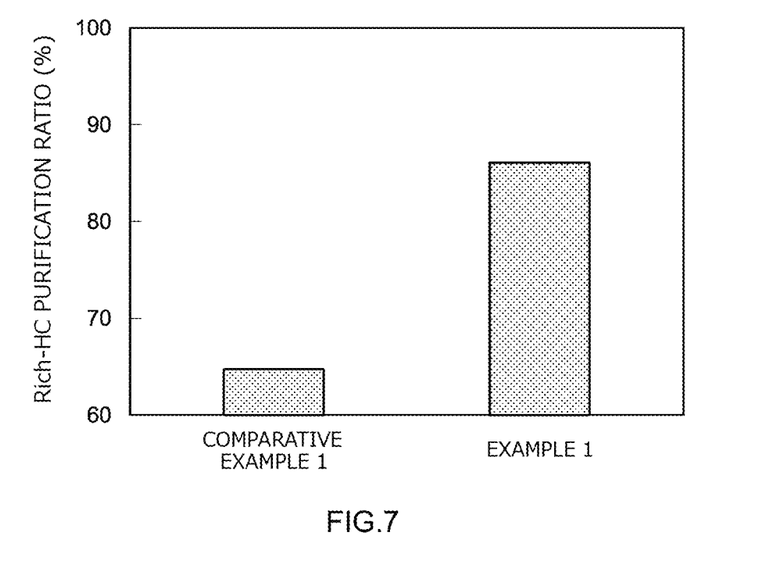
FIG. 7 is a graph of comparison of the HC purifying performance of the Pt-containing powder material used in Example 1 with that of the exhaust gas purification catalyst of Comparative Example 1.

As shown in FIG. 7, the Pt-containing powder material used in Example 1 showed a much higher HC purification ratio.

In Example 1, Ba is carried on the carrier secondary particle in a highly dispersed manner, and Pt and Ba are so close to each other that a correlation is observed between the existence positions of Pt and Ba. For this reason, conceivably, the electron donation of Ba to Pt causes HC poisoning inhibition, resulting in an improvement of the HC purifying performance under the Rich atmosphere.

Test Example 5: Evaluation by FE-EPMA of Rh-Containing Catalyst Layer

The lamination part of the upper layer catalyst layer and the lower layer catalyst layer of the exhaust gas purification

TABLE 1

| | Ba source | Ba fixing material | pH upon preparation | Ba dissolution rate (%) | $R_{Ba/Pt}$ | Ba sulfate particle diameter (nm) | Rich-HC purification ratio (powder, %) |
|---|---|---|---|---|---|---|---|
| Example 1 | Ba acetate | Taurine | 7.69 | 0 | 0.798 | 17 | 95 |
| Example 2 | Ba acetate | Taurine | 7.49 | 0 | 0.713 | 30 | 91 |
| Comparative Example 1 | Ba sulfate | — | 7.89 | 0 | −0.128 | 41 | 86 |
| Comparative Example 2 | Ba acetate | Ammonium sulfate | 4.65 | 0 | 0.060 | 42 | — |
| Comparative Example 3 | Ba acetate | — | 7.57 | 70 | 0.720 | — | — |

The results of Table 1 and FIGS. 3 to 6 indicate as follows: while Ba is aggregated on the outside of the carrier secondary particle in Comparative Examples 1 and 2, Ba is carried in a highly dispersed manner in the inside of the carrier secondary particle in Example 1.

A value of the correlation coefficient of 0.5 or more is construed as having strong correlation, and the value of 0.7 or more is construed as having particularly strong correlation. In Example 1, the value of the correlation coefficient catalyst manufactured in Example 1 was cut out, and the cross section thereof was polished. Using a commercially available carbon coater (product from Vacuum Device Co., Ltd.: VC-100W), carbon as a conductive substance was deposited. The cross section was subjected to area analysis using the FE-EPMA device (JXA-8530F). The measurement conditions were set as:

Pixel size: 0.85 μm×0.85 μm,
Number of pixels measured: 256×256,

Acceleration voltage: 20 kV,
Irradiation current: 100 nA,
Probe diameter: set at the minimum in the measurement conditions,
Unit measurement time: 50 ms/1 pixel, and
Measurement magnification: ×400.

Then, for every pixel, the intensity (α: cps) of the characteristic X ray of Ba element and the intensity (β: cps) characteristic X ray of Rh were measured.

In such area analysis, the threshold value of the X ray intensity per 1 pixel (section) was set at 15 cps for Ba, and at 5 cps for Rh, and the pixel showing an intensity equal to, or smaller than the threshold value was excluded from the data for calculation of the correlation coefficient.

From the resulting data, using the CORREL function feature of the spreadsheet software "Excel", the correlation coefficient $R_{Ba/Rh}$ was determined.

As a result, the correlation coefficient $R_{Ba/Rh}$ was 0.023, and a correlation was not observed between the existence positions in the catalyst of Ba and Rh. This indicates that, for the exhaust gas purification catalyst of Example 1, Ba is fixed in the upper layer of the Pt-containing alkaline-earth metal carrying region, which can prevent the contact between Ba present in the upper layer and Rh present in the lower layer.

Test Example 6: Purification Ratio Measurement of Exhaust Gas Purification Catalyst Each exhaust gas purification catalyst manufactured in Example 1 and Comparative Example 1 was set in the exhaust system of an engine, and the engine was operated, and was tested for the durability.

After such a durability test, using the catalyst, the HC purification ratio and the NOx purification ratio after 3 minutes from switching of the air-to-fuel ratio of a mixed gas to be supplied to the engine from Lean to Rich were measured. The results are shown in FIGS. 8 and 9.

Figure 8:
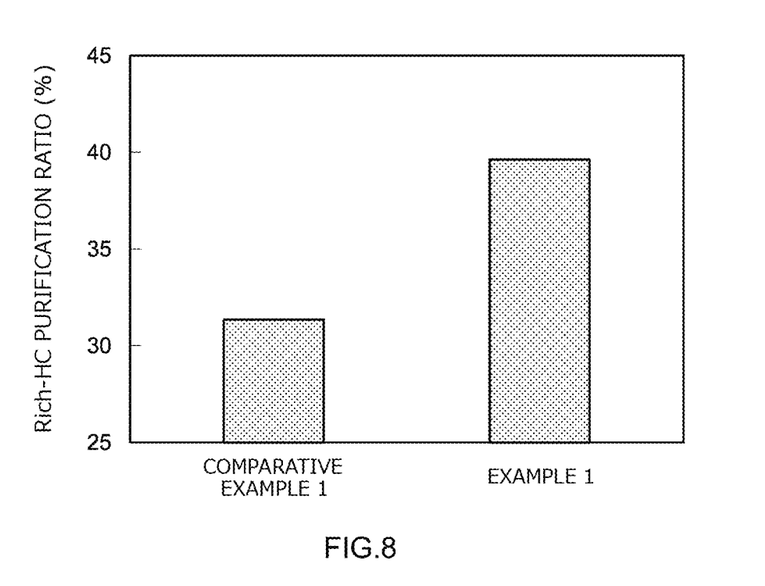
FIG. 8 is a graph of comparison of the HC purifying performance of the exhaust gas purification catalyst of Example 1 with that of the exhaust gas purification catalyst of Comparative Example 1.
Figure 9:
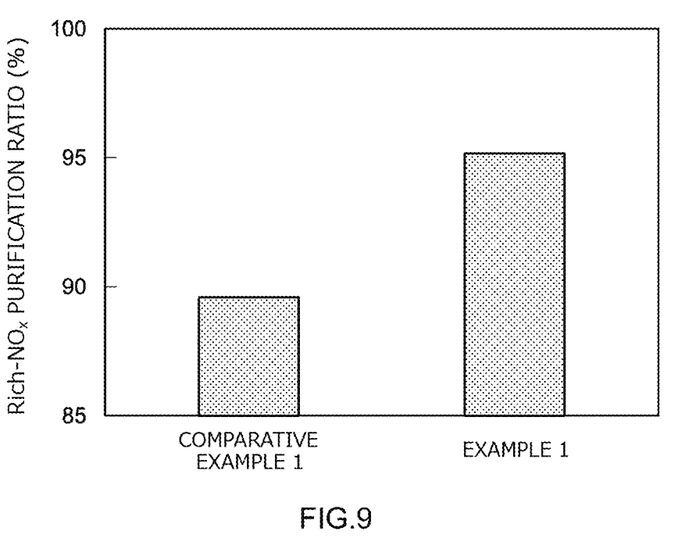
FIG. 9 is a graph of comparison of the NOx purifying performance of the exhaust gas purification catalyst of Example 1 with that of the exhaust gas purification catalyst of Comparative Example 1.

As indicated by the results of FIGS. 8 and 9, the exhaust gas purification catalyst of Example 1 showed much higher HC purification ratio and NOX purification ratio than those of the exhaust gas purification catalyst of Comparative Example 1. The reason for this can be considered as follows.

In Example 1, Ba is carried on the carrier secondary particle in a highly dispersed state. For this reason, Pt and Ba are so close to each other that a correlation is observed between the existence positions of Pt and Ba. Accordingly, the electron donation of Ba to Pt causes HC poisoning inhibition, resulting in an improvement of the HC purifying performance under the Rich atmosphere. Further, Ba is fixed, which prevents the contact between Ba and Rh. This prevents metalation inhibition of Rh by Ba. Further, the improvement of the HC purifying action of the upstream Pt-containing catalyst layer reduces the amount of HC to flow into the downstream Rh-containing catalyst layer. As a result, poisoning of Rh is inhibited. From the description up to this point, the purification performance of the coexistent NOx is also improved.

Up to this point, the present invention was described in details. However, these are merely illustrative, and are not intended to limit the scope of the appended claims. The technology described in the appended claims include various modifications and changes of the foregoing specific examples.

The invention claimed is:

1. An exhaust gas purification catalyst which is configured to be arranged in an exhaust pipe of an internal combustion engine and configured to purify an exhaust gas exhausted from the internal combustion engine, the exhaust as purification catalyst comprising:
   a base material; and
   a catalyst layer formed on the base material and having an alkaline-earth metal carrying region including:
      a porous carrier particle constituted of an inorganic compound,
      Pt carried on the porous carrier particle, and
      a sulfuric acid salt of at least one alkaline-earth metal carried on an outer surface of and inside of the porous carrier particle in a dispersed state,
   wherein a value of $R_{Ae/Pt}$ is 0.5 or more, where $R_{Ae/Pt}$ represents a Pearson's correlation coefficient, the Pearson's correlation coefficient being determined by:
      performing an area analysis of a cross section of the alkaline-earth metal carrying region of the catalyst layer by FE-EPMA under a condition of:
         pixel size 0.34 μm×0.34 μm; and
         number of measured pixels 256×256; and
      measuring an intensity (α: cps) of a characteristic X ray of an element (Ae) of the alkaline-earth metal and an intensity (β: cps) of a characteristic X ray of Pt for each pixel.

2. The exhaust gas purification catalyst according to claim 1, wherein
   the value of the correlation coefficient $R_{Ae/Pt}$ is 0.7 or more.

3. The exhaust gas purification catalyst according to claim 1, wherein
   an average particle diameter based on the X-ray diffraction method of the alkaline-earth metal sulfuric acid salt carried on the porous carrier particle is 30 nm or less.

4. The exhaust gas purification catalyst according to claim 1, further comprising a catalyst layer including Rh as a catalyst metal on the downstream side in the direction in which the exhaust gas in the catalyst layer flows.

5. The exhaust gas purification catalyst according to claim 1, wherein the alkaline-earth metal sulfuric acid salt includes at least barium sulfate ($BaSO_4$).

6. A method for manufacturing an exhaust gas purification catalyst according to claim 1, the method comprising the steps of:
   forming, on a base material, a catalyst layer having, at at least one part thereof, an alkaline-earth metal carrying region which includes:
   a porous carrier constituted of an inorganic compound,
   Pt carried on the porous carrier, and
   a sulfuric acid salt of at least one alkaline-earth metal carried on the porous carrier; and
   firing the base material which has the catalyst layer formed thereon, wherein
   the formation step of the catalyst layer includes:
   mixing the following components:
   an inorganic compound particle forming the porous carrier;
   a Pt particle or a precursor for precipitating Pt;
   a water-soluble compound of the alkaline-earth metal; and
   a S-containing water-soluble organic compound containing S as a constituent element, and capable of forming the sulfuric acid salt of the alkaline-earth metal;
   with an aqueous solvent, to prepare a raw material suspension,
   drying and further firing the raw material suspension, thereby preparing a powder material including the porous carrier, Pt, and the sulfuric acid salt of the alkaline-earth metal mixed therein, preparing a slurry for forming an alkaline-earth metal carrying region, including at least the powder material and an aqueous solvent, and forming the alkaline-earth metal carrying region on the base material using the slurry.

7. The method for manufacturing an exhaust gas purification catalyst according to claim 6, wherein the S-containing water-soluble organic compound is a water-soluble organic matter having at least one functional group of a sulfo group ($-SO_3H$), a sulfonyl group ($-S(=O)_2-$), and a sulfinyl group ($-S(=O)-$).

8. The method for manufacturing an exhaust gas purification catalyst according to claim 6, wherein the water-soluble compound of the alkaline-earth metal is an acetic acid salt, a nitrous acid salt, or an iodide of any alkaline-earth metal selected from Ba, Sr, and Ca.

* * * * *